US008393541B2

(12) United States Patent
Naumovsky

(10) Patent No.: US 8,393,541 B2
(45) Date of Patent: Mar. 12, 2013

(54) CUSTOM SCANNING DEVICE AND AUTOMATED CAR AUCTION FACILITY MANAGEMENT

(75) Inventor: Sergey Naumovsky, Holland, PA (US)

(73) Assignee: Key Control Holding, Inc., Houston, TX (US)

( * ) Notice: Subject to any disclaimer, the term of this patent is extended or adjusted under 35 U.S.C. 154(b) by 0 days.

(21) Appl. No.: 13/155,384

(22) Filed: Jun. 7, 2011

(65) Prior Publication Data

US 2011/0297741 A1 Dec. 8, 2011

Related U.S. Application Data

(60) Provisional application No. 61/352,355, filed on Jun. 7, 2010.

(51) Int. Cl.
*G06K 7/10* (2006.01)
*G06K 15/00* (2006.01)
*G06K 7/14* (2006.01)
*G06K 19/00* (2006.01)
*G06F 17/00* (2006.01)
*G06Q 30/00* (2006.01)

(52) U.S. Cl. .................... 235/462.13; 235/975; 235/487; 235/454; 235/462.31; 705/26.3; 705/14.71

(58) Field of Classification Search ............. 235/462.13, 235/375, 487, 492, 493, 462.01, 435, 454, 235/462.31; 705/14.71, 26.1, 26.3
See application file for complete search history.

(56) References Cited

U.S. PATENT DOCUMENTS 5,774,873 A * 6/1998 Berent et al. ................. 705/26.3
7,145,507 B2 * 12/2006 Luo et al. ................. 342/357.34
7,323,989 B2 * 1/2008 Allen ......................... 340/572.1
7,681,921 B2 * 3/2010 Mercer et al. ................... 283/56
2003/0135304 A1 * 7/2003 Sroub et al. ........................ 701/1
2004/0088228 A1 * 5/2004 Mercer et al. ................... 705/28
2005/0128140 A1 * 6/2005 Luo et al. ................. 342/357.07
2006/0055564 A1 * 3/2006 Olsen et al. ................... 340/994
2006/0155430 A1 * 7/2006 Burgess ............................ 701/1
2006/0187043 A1 * 8/2006 Allen ......................... 340/572.1
2007/0057817 A1 * 3/2007 Aman ........................... 340/933
2008/0021714 A1 * 1/2008 Kraez et al. ........................ 705/1
2008/0231446 A1 * 9/2008 Cresto ........................ 340/572.1
2008/0301008 A1 * 12/2008 DePrisco et al. ................ 705/28
2009/0026254 A1 * 1/2009 Johnson et al. ............... 235/375
2009/0079591 A1 * 3/2009 Motoyama .................... 340/991
2009/0105950 A1 * 4/2009 Arteaga et al. ................ 701/213
2010/0148937 A1 * 6/2010 Howard ....................... 340/10.6
2011/0074629 A1 * 3/2011 Khan et al. ............... 342/357.64
2011/0093159 A1 * 4/2011 Boling et al. ................... 701/32
2011/0297747 A1 * 12/2011 Naumovsky ............. 235/462.13

* cited by examiner

*Primary Examiner* — Daniel Walsh
(74) *Attorney, Agent, or Firm* — Adolph Locklar

(57) ABSTRACT

An automobile auction system to receive scanned automobile bar codes and function bar codes along with location data and to process the scanned bar codes. The system includes a first interface for receiving scanned bar codes, GPS coordinates, scanner ID, and time of scan from a custom scanning device. A second interface is to receive a map of an auto auction facility from a map source. A server is to process the bar codes and the GPS coordinates received from the scanning device and to associate the GPS coordinates to the map of the auto auction facility received from the map source. The system may process bar codes associated with functions, such as employees, shops or staging operations, specific tasks, and work orders. The function bar codes may, for example, assign scanners to employees, record tasks being performed, record employee performing the tasks, and record shop or staging operations opened/completed.

20 Claims, 6 Drawing Sheets

CUSTOM SCANNING DEVICE AND AUTOMATED CAR AUCTION FACILITY MANAGEMENT

PRIORITY

This application claims the priority under 35 USC §119 of Provisional Application 61/352,355 entitled "GPS Based Vehicle Tracking System" filed on Jun. 7, 2010. Application 61/352,355 is herein incorporated by reference in its entirety but is not prior art.

BACKGROUND

Automobile auctions process thousands of automobiles, have various stages of operations through which automobiles may be processed or located, and are spread out over large territories. During the automobiles stay at the auction, the automobile may be moved around the territory quite a bit as it proceeds through the stages and/or as it is stored where space is available. Knowing where the automobile is while it is within an automobile auction facility is important for inventory and efficiency in finding the automobile when needed. If the automobile is not in the location where it is believed to be, it can take a long time to locate the automobile as the facility is so large.

Automobiles received at the automobile auction facility are typically pre-registered. The pre-registration may include details about the automobile including VIN number, make, model, year, and color, details about the seller, details regarding what type of work is to be performed, and the location of where the automobile is to be auctioned (e.g., lane and run number). When an automobile arrives, it may enter the facility at a receiving area where the VIN number may be entered into an auction system so the auction system can retrieve details regarding the automobile. An identification sticker, including a bar code that identifies the automobile, may be printed and secured to the automobile (e.g., on the windshield). In addition, a work order identifying the tasks to be performed on the automobile may be printed and secured to the automobile (e.g., on a side window). The bar code for the automobile may be scanned at various times as it proceeds to different locations associated with the work order.

For example, the work order may initially indicate that the automobile should be inspected. Accordingly, the automobile may proceed to a docking area (e.g., parking lot) as it awaits inspection. The automobile may then enter an inspection area where the automobile is inspected and results of the inspection are entered into the auction system. After inspection, the automobile may proceed to a docking area while it awaits disposition of the inspection results (e.g., seller authorizing various repairs). Once the inspection disposition is known the automobile may proceed to one or more shops to have the necessary repairs made (and possibly to various holding lots as well). Once the work on the automobile is complete, the automobile may proceed to an auction sales area (or holding lot). After the automobile is auctioned (sold) it may proceed to a pick up area, an after sale area, and/or an arbitration area.

At each area that the automobile proceeds to a user may scan the barcode sticker on the automobile using a bar code scanner (e.g., Symbol 9090 scanner/portable PC). In addition to scanning, the bar code scanner may have programs running thereon and a user interface to enable the user to enter various data (e.g., job opened/closed, employee performing work, location) along with the bar code that is scanned. For example, a specific employee responsible for cars entering/exiting a holding area parking lot may select a program related to checking in/out cars into the lot and scan the bar code on the automobile as it enters/exits the lot. A user in a shop may select a program related to jobs and may scan the bar code of the automobile and then enter data related to the jobs performed. The user may enter their contact data each time they scan an automobile or may enter their contact data at the beginning and end of their shift, and the scanner may associate their contact data with each automobile they have scanned.

The scanners may be WiFi enabled so that the data scanned and entered is wirelessly transmitted to a server for collection and processing. The currently implemented scanners are relatively expensive (e.g., approximately $2000), require some technical knowledge to use (e.g., ability to select appropriate program and enter necessary data), and are not ergonomically adapted for employees to carry around (e.g., relatively large, awkward footprint), so the number of scanners utilized and the number of personnel authorized to use them is limited. Programming scanners for specific tasks to simplify the user interaction (e.g., having a scanner programmed specifically for a parking lot attendant) reduces the functionality of the scanner without also reducing the cost of the device, which makes that an impractical option. In addition, this limits the ability of using the scanner from one location in another location without reprogramming if the need arises, which is not practical.

The limited number of scanners utilized and the limited number of personnel using the scanners limits the ability of the bar code system to track the exact location of the automobiles, the work performed on the automobiles, and work performed by various employees of the auto auction yard.

BRIEF DESCRIPTION OF THE DRAWINGS

The features and advantages of the various embodiments will become apparent from the following detailed description in which.

DETAILED DESCRIPTION

Figure 1A:
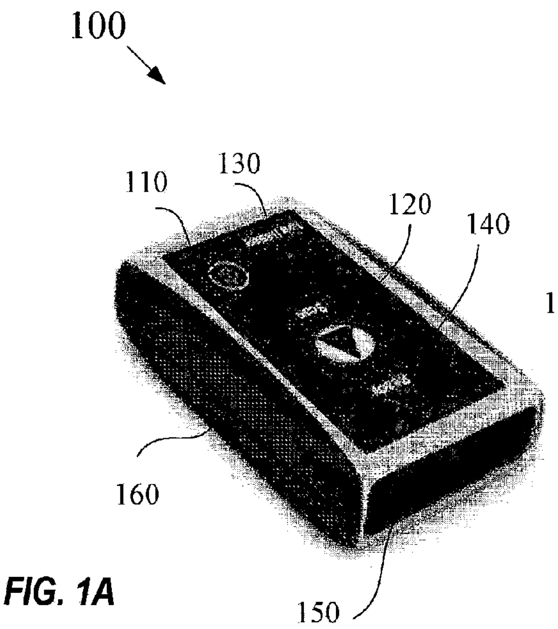
FIGS. 1A-E illustrate several views of an example custom designed scanner device for use in an automobile auction environment, according to one embodiment.

In order to aid in tracking the location of the automobiles at the automobile auction facility, scanners may include a global positioning system (GPS) sensor that can record GPS coordinates at the same time that a scan is performed. The GPS coordinates, along with the bar code and any data entered, can be sent to a server for processing. The server may utilize the GPS coordinates to determine the location of a last scan and aid in determining an exact location of the automobile. The server may be able to display the location of the GPS coordinates on a map (e.g., Google Earth) to identify the location of the automobile. Various lots and/or shops may be configured on the map so that the GPS coordinates may be utilized to identify the particular lot or shop.

Utilizing the GPS coordinates may aid in determining the location of an automobile within the automobile auction facility. However, if the scanners (e.g., symbol scanner/portable PC) utilized are too expensive and too complex to be widely used by a sufficient number of employees involved in the movement of, or work on, the automobiles the GPS coordinates may not provide accurate location data. For example, there will be no GPS location data for the automobile if a lot attendant scans in the automobile when it is first received and then another employee drives the automobile to a back lot but that employee is not assigned a scanner and there is no employee with a scanner available at the back lot, because it was not scanned at the location it was parked.

Smart phones equipped with cameras, such as Blackberries, iPhones and Android phones, may be programmed with bar code reader applications that enable the smart phones to take a picture of the bar code and convert the image into a scanned bar code. The smart phones may also be programmed with applications necessary to gather the appropriate data in addition to the bar code. The smart phones may also include a GPS sensor that can record GPS coordinates while scanning. The smart phones are also ergonomically designed to be carried by individuals on the move, are likely cheaper than the symbol scanner/portable PC, and employees may be more familiar with using a smart phone. However, using such a device will result in delays related to the image to scan conversion, due to the lack of dedicated bar code scan engines in smart phones, but rather use of software to convert a camera image into the bar code scan. In addition, the use of the smart phones may still require some technical know-how to initiate the correct program and to enter data into the program. Furthermore, the smart phones may enable the employees to make phone calls, surf the Internet and other activities that are not related to their jobs. Moreover, the use of—smart phones may include a monthly fee that may make supplying a large number of employees cost prohibitive.

A custom designed device that includes a scanner and GPS sensor, is ergonomically designed to be carried around by employees, is easy to use, is cheaper than current scanners, and does not require the monthly fees of smart phones would enable the devices to be utilized on a wider scale (e.g., a majority of the employees) and thus would increase the tracking of the automobiles. If all employees had, or at least had access to and the ability to use, the custom designed devices each time an automobile moved locations, the employee who moved the vehicle could scan the automobile at its end location and the GPS coordinates associated therewith could be recorded so that the location of the automobile was known at all (or most) times.

FIGS. 1A-E illustrate several views of an example custom designed scanner device 100 for use in an automobile auction environment. The size and shape of the device 100 make it easy to carry and the knowledge required to operate the device 100 is minimal. The device 100 may be designed to be rugged and capable of being utilized in outdoor environment. The device 100 may be made of a plastic, such as acrylonitrile butadiene styrene (ABS).

Figure 1B:
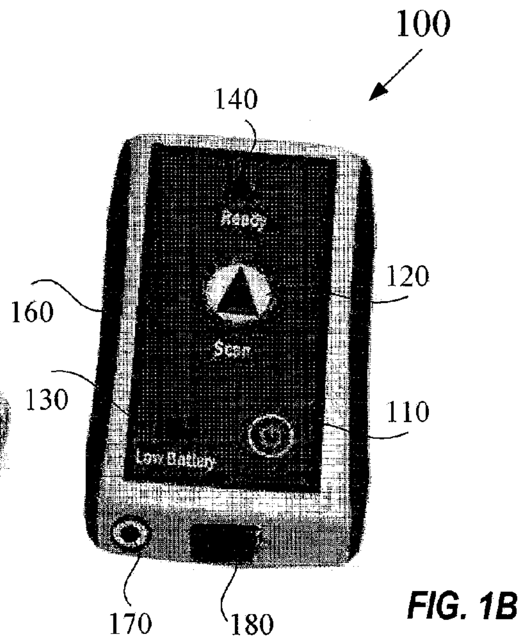

FIGS. 1A-B illustrate example perspective and front views of the example device 100. The front face of the device 100 may include a very simple user interface. The user interface may include a power button 110 to turn the device 100 on and a scan button 120 to initiate scanning. The buttons may be a membrane keypad and may have backlighting that is illuminated when, for example, the power is on or a scan is being performed. The user interface may also include indicator lights. A low battery indicator light 130 to notify the user when the battery is getting low and a ready indicator light 140 to notify the user when the device 100 is ready for use (GPS coordinates are acquired by sensor) are illustrated. The device 100 may have a “buzzer” (not illustrated) that would sound when the bar code scan is done and accepted by the device 100. The user interface is not limited to the layout illustrated in number or type of buttons, number or type of indicators, and/or orientation of the buttons/indicators. Rather, any type of user interface that keeps the operation of the device 100 simple so that minimum skill is required to operate is within the current scope.

The device 100 may have a bar code scanner operating on a top surface. A panel 150 is illustrated, through which a laser is shone and a reflection is received by a bar code scanning engine. Sides 160 may be ergonomically designed with concave sides and a rubber molded grip secured thereto so as fit within a hand with a secure grip. The bottom surface may have connectors 170 that may be used to charge the device 100 (e.g., individually, via rack charger for multiple scanner units) and/or connectors 180 that may be used to communicate externally. The type of connectors is not limited to the number, type or location of those illustrated.

Figure 1C:
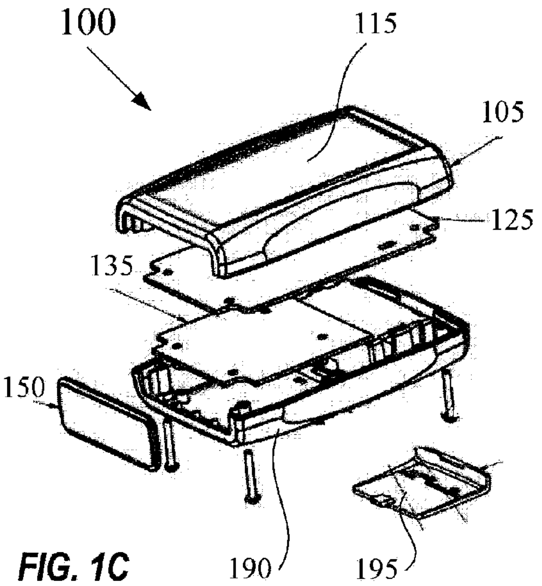

FIG. 1C illustrates an example exploded view of the example device 100. The device 100 includes an upper cover 105 and a lower cover 190. The upper cover 105 may include an opening 115 in an upper surface to enable a membrane having the user interface (e.g., buttons 110, 120; indicators 130, 140) defined thereon to be located therein. The lower cover 190 may have a battery compartment cover 195 formed therein for providing access to a battery compartment housing batteries. The device 100 may be capable of housing an upper circuit board 125 and a lower circuit board 135. The circuit boards 125, 135 may have electronics located thereon for operating the device 100. Electronics associated with the user interface may be located on the upper circuit board 125 so as to be located under the membrane defining the user interface. The upper surface may include the panel 150, and the bar code scanner engine (not illustrated) may be located therebehind for providing scanning.

Figure 1D:
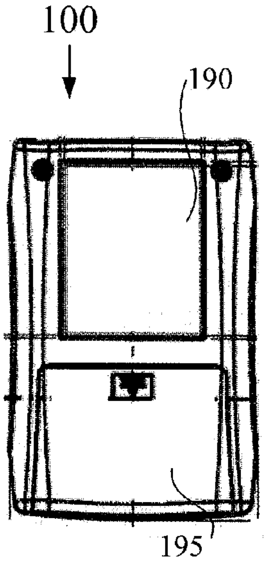
Figure 1E:
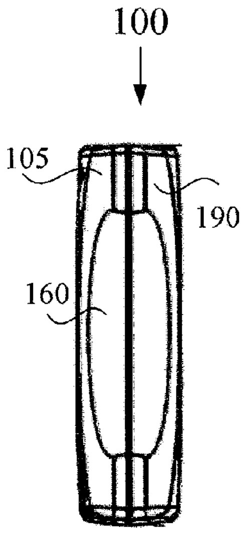

FIG. 1D illustrates a back view of the device 100 showing the battery compartment cover 195. FIG. 1E illustrates a side view of the device 100 showing the upper cover 105 and lower cover 190 connected and the ergonomic design (e.g., concave shape) of the sides 160.

Figure 2:
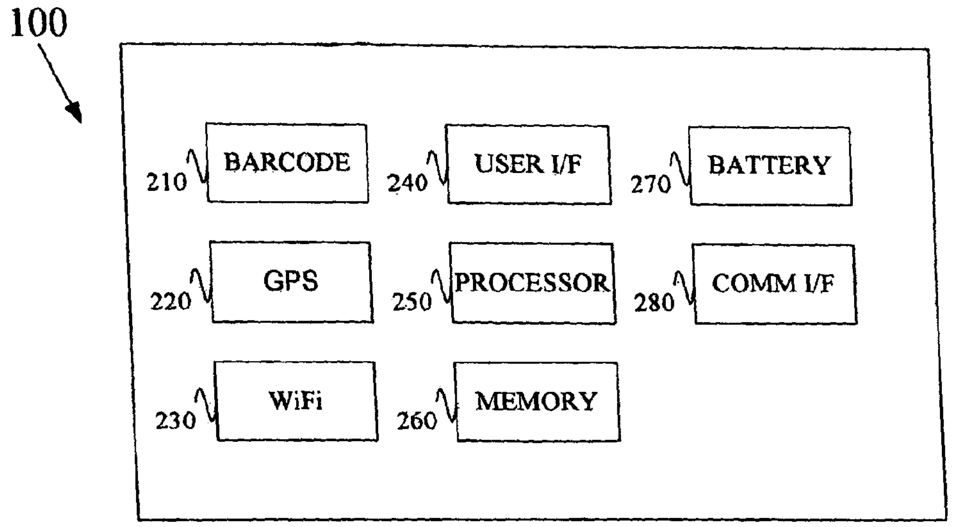
FIG. 2 illustrates an example functional block diagram of an example scanner device, according to one embodiment.

FIG. 2 illustrates an example functional block diagram of the example scanner device 100. The device 100 includes a bar code scanner engine 210, a GPS sensor 220, a WiFi module 230, a user interface engine (e.g., buttons, indicator lights, buzzer) 240, a processor 250, memory 260, a rechargeable battery 270, and a communications interface (e.g., battery charging, internal configuration) 280. The processor 250 may control the operations of the device 100. The user interface engine 240 may receive commands from the user, such as the turning on/off of the device 100 and initiating of a scan. The user interface engine 240 may also provide information to the user, such as illuminating the low battery indicator light when it is determined that the charge left in the rechargeable battery 270 has reached some threshold and/or sounding the buzzer when scan is accepted.

Upon initiation of a scan, the bar code scanner engine 210 may read a bar code presented thereto and the GPS sensor 220 may gather GPS coordinates. The time that the scan occurred may also be captured. The time may be provided by a clock that is part of the processor 250, the bar code scanner engine 210, the GPS sensor 220 or a separate clock (not illustrated). The WiFi module 230 may transmit the captured data (e.g., bar code, GPS coordinates, time of scan, unique scanner ID) to a WiFi access point that may provide the data to a server.

The data captured may be stored in memory 260 if the data cannot be transmitted to the server via the WiFi module 230 (WiFi not available) or if the transfer is not successful. The memory 260 may be capable of storing a certain amount of data therein (e.g., 100 strings of captured data). If WiFi is still not available after the memory 260 is full the processor 250 may turn off the device and indicate it's unavailability on the user interface 240 (e.g., turn off ready indicator). Alternatively, all the data captured may be stored in memory 260 and after it is confirmed that the data was successfully received by the server the data may be discarded therefrom.

The rechargeable battery 270 may provide power to operate the device 100 and may be capable of receiving external power for recharging. The communications interface 280 may enable data to be transferred via a cable (e.g., in the event that there is no WiFi access available), to communicate with the server and/or other devices 100. The communications interface 280 could be used to program and/or configure the device 100. For example, the communications interface 280 could be used to program the configuration of the WiFi network into the device 100.

The device 100 may include a processor readable storage medium that has programs, applications and/or instructions stored therein that when executed by the processor 250 cause the processor 250 to perform various functions necessary to control the operation of the device 100. The processor readable storage medium is not separately illustrated but may be part of the processor 250, part of the memory 260, a separate component or some combination thereof.

Figure 3:
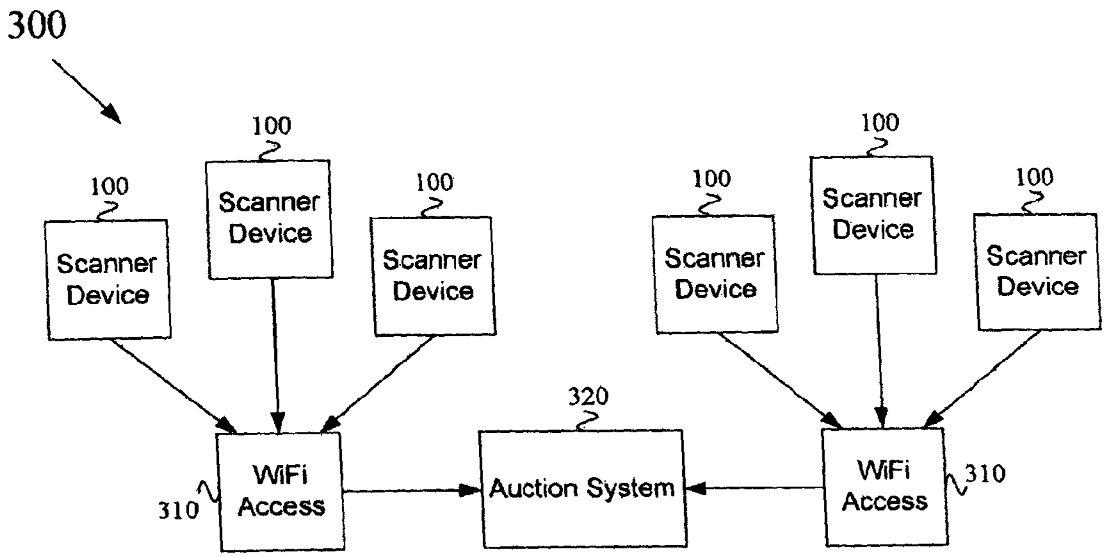
FIG. 3 illustrates an example GPS coordinate scanning system, according to one embodiment.

FIG. 3 illustrates an example GPS coordinate scanning system 300. The GPS coordinate scanning system 300 utilizes the scanning devices 100 to scan bar codes and record associated GPS coordinates at the time the scan is performed. The devices 100 transmit the data captured (e.g., bar code, GPS coordinates) using WiFi antenna to WiFi access points 310 that provide the data to an auction system 320. The WiFi access points 310 may be located throughout the automobile auction facility so that a device 100 located anywhere within the automobile auction facility may be capable of communicating with at least one WiFi access point 310.

Figure 4:
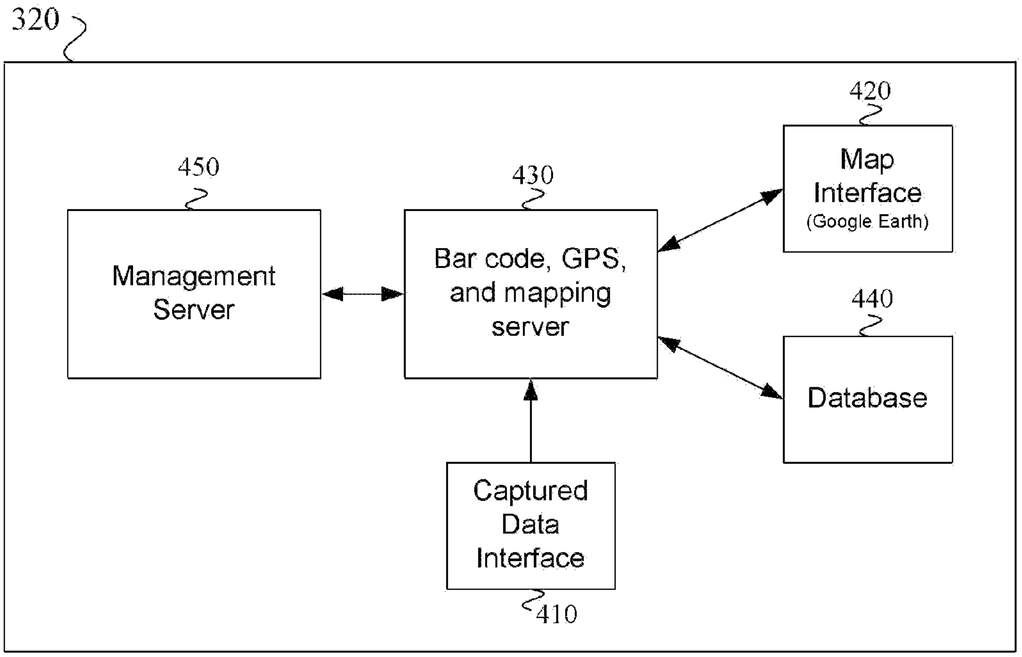
FIG. 4 illustrates an example functional diagram of an auction server, according to one embodiment.

FIG. 4 illustrates an example functional diagram of an auction system 320. The auction system 320 may include a captured data interface 410 for receiving the captured data (e.g., scanned bar code, GPS coordinates, scanner ID, time of scan) and a map interface 420 for receiving mapping data (such as maps provided by Google Earth API). A server 430 may be utilized to process the bar codes and the GPS coordinates received from the devices 100 via the captured data interface 410 and to associate the GPS coordinates to a map of the automobile auction facility received from a map source, such as Google Earth, via the map interface 420. The server 430 may write data to and receive data from a database 440. The server 430 may interact with a management server 450 that controls the operations of the automobile auction facility.

With regard to the mapping functionality, the server 430 may be able to plot different areas (lots and job processing locations) on the map and to define the GPS coordinates associated with these areas. When the GPS coordinates for a scan are received the server 430 may utilize the GPS coordinates for each of the locations to aid in determining which location the automobile is located in. If the automobile needs to be found the server 430 may highlight the location on the map in place of or in addition to identifying GPS coordinates and an approximate location on the map.

The auction system 320 may include a computer readable storage medium (not illustrated) that has programs, applications and/or instructions stored therein that, when executed by a computer (e.g., server), causes the computer to perform various functions (e.g., such as those illustrated in FIG. 4) necessary to control the operation of the auction system 320. The computer readable storage medium is not separately illustrated but may be part of the server 430, the management server 450, part of the database 440, a separate component or some combination thereof.

Figure 5:
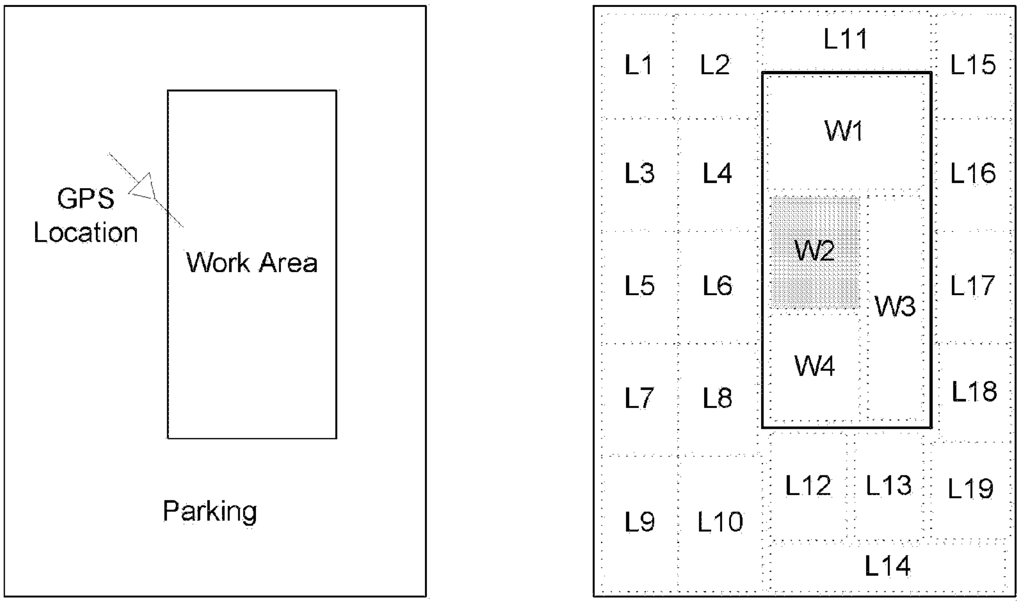
FIG. 5 illustrates the plotting of areas for an automobile auction facility on a map and the use of the areas to identify the location of an automobile, according to one embodiment.

FIG. 5 illustrates the plotting of areas within the automobile auction facility on a map and the use of the areas to identify the location of an automobile. The illustration on the left shows the automobile auction facility, the parking areas and the work area. The illustration on the right shows the various parking locations (L1-L19) and work locations (W1-W4) identified on the map. The illustration on the left shows a GPS marker location displayed on the map, while the illustration on the right illustrates the appropriate area (W2) highlighted and identified.

Figure 6:
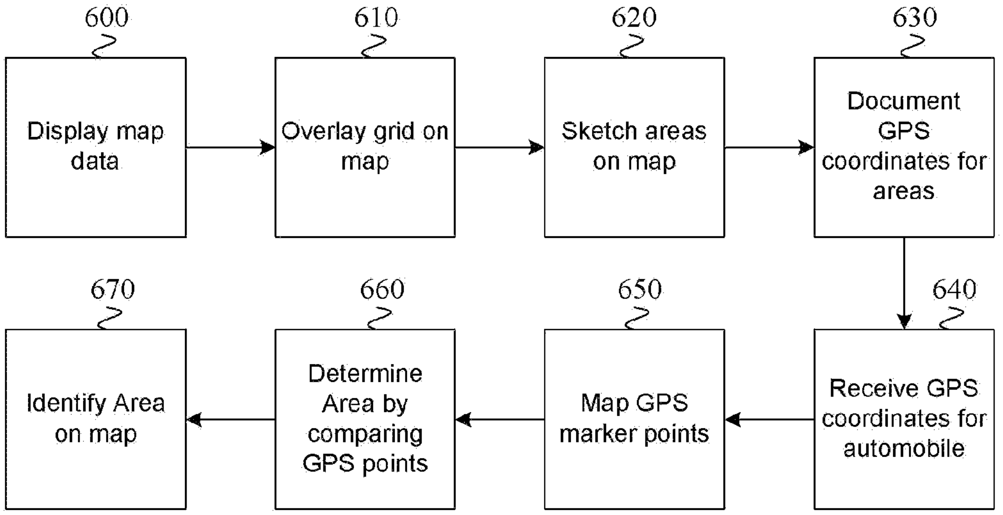
FIG. 6 illustrates a flow chart for mapping the areas on the map, according to one embodiment.

FIG. 6 illustrates a flow chart for mapping the areas on the map. Initially, a map of the automobile auction facility is displayed 600. A grid is then overlaid on the map 610. The grid is used to draw the locations of the various lots and work areas on the map 620. GPS data is gathered for the various areas 630. When a bar code is scanned and the GPS coordinates are received 640 a GPS marker for the location is illustrated on the map 650. The GPS coordinates are compared to the GPS coordinates for the different areas to determine what area the automobile is located within 660 and the area is also identified on the map 670.

In addition to using the map and the areas defined on the map to find a particular automobile, the auction system 320 may be able to identify the capacity of each of the areas based on the location data for each of the automobiles in the automobile auction facility. This data may be utilized to manage the resources of the automobile auction facility.

Figure 7:
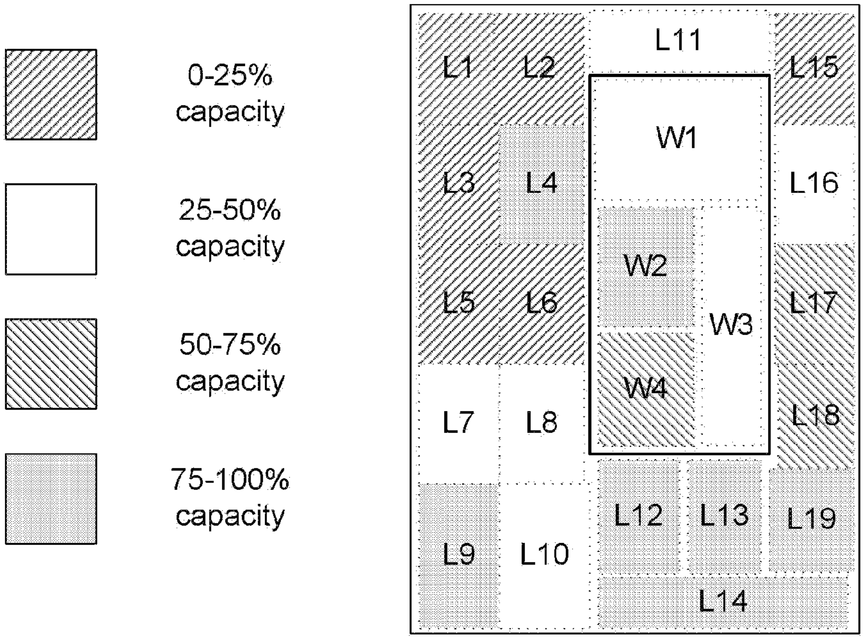
FIG. 7 illustrates identifying capacity of defined areas for the automobile auction facility on a map of the facility, according to one embodiment.

FIG. 7 illustrates identifying capacity of the defined areas of the automobile auction facility on the map of the automobile auction facility. As illustrated, the areas are coded based on their capacity.

The device 100 has been described as being used to scan bar codes associated with the automobiles, much like current scanners. In addition, since the device 100 does not have a user interface to enable data to be entered therein, bar codes may be associated with functions, such as employees, shops or staging operations (e.g., detail shop), specific tasks (e.g., oil change, move automobile), and work orders. Bar codes associated with functions may have a prefix, so that a server (e.g., server 430) recognizes it as a "function" scan, rather than a regular automobile ID scan. Each function may have a unique prefix. These bar codes may be scanned to, for example, assign scanners to employees, record tasks being performed, record employee performing the tasks, and record shop or staging operations opened/completed.

The bar codes for the employees may be located on their employee badges. When a scanner is used to scan an employee's badge it may associate the employee with that scanner and the tasks performed by that scanner until another employee's bar code is scanned. The use of employee bar codes enables the scanner to be easily assigned to an employee and then reassigned to a different employee. The reassignment may enable scanners to be shared between employees during the course of a day or to be assigned to a new employee each day. For example, the devices may be placed in a power charging station each night to recharge the batteries and the next day may be assigned to the employee that grabs it and scans their employee badge.

The bar codes for shops/staging operations and specific tasks may be located on badges (e.g., cards within a plastic sleeve) clip boards or the like and may be located at the entrance (receiving area) to the shop/staging area or where the tasks are performed (at the service lane). When an automobile is received at a staging area an employee may scan the automobile bar code and the bar code for the shop/staging area (or vice versa), and the scanned bar codes and GPS coordinates may be transmitted to the server 430. Based on these scans the server 430 may now know that the automobile has changed staging areas from where it was located based on a last scan to where it is now located based on the new scan. The server 430 may also know that a work order for that vehicle has been opened for that shop/staging area. The work order may be opened the first time the bar code for the shop/staging area is scanned for a specific automobile and closed the second time the shop/staging area bar code is scanned.

Figure 8A:
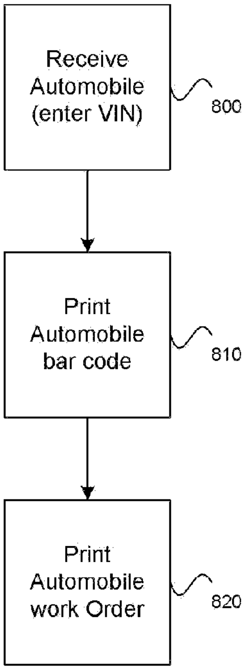
FIGS. 8A-C illustrate several example flow charts of the use of bar codes and the custom scanner in operations of an automobile auction facility, according to one embodiment.
Figure 8B:
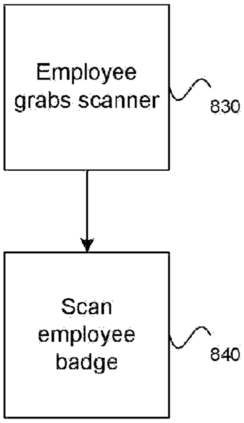
Figure 8C:
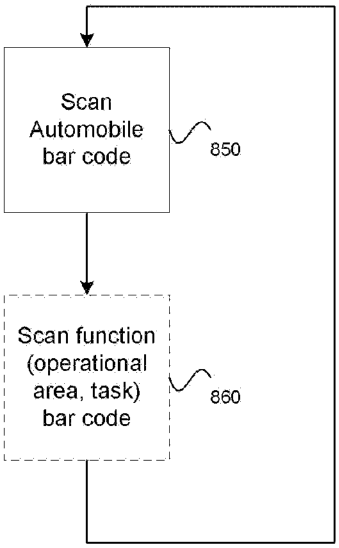

FIGS. 8A-C illustrate several example flow charts of the use of bar codes and the custom scanner in operations of an automobile auction facility. FIG. 8A illustrates the process of assigning a bar code to an automobile. The automobile may be pre-registered so that it is already in the auction system. When the automobile arrives at the automobile auction facility the VIN number for the automobile is entered in the auction system 800. A bar code sticker identifying the automobile may be printed 810 and the bar code may be placed on the windshield of the automobile. The bar code sticker may stay on the automobile for identification purposes the entire time the automobile is located at the automobile auction facility.

A work order defining the tasks to be performed on the automobile may also be printed 820. The work order may be secured to the automobile (side window) or placed within the vehicle. The work order allows employees to read what tasks need to be performed on the automobile. The work order printed at this point may include all the tasks to be performed or just the operational areas (e.g., body shop, mechanic, detailing, inspection) that the automobile needs to go to have tasks performed. The work order may also be available on computers that are part of the auction system.

FIG. 8B illustrates the process of assigning an employee to a bar code scanner. An employee selects a scanner for his use 830. For example, the scanner may be picked up from a powering station at the beginning of an employee's shift. The employee then scans their employee ID that includes a bar code associated with the employee 840 and the scanner transmits the scanned data (e.g., bar code, GPS coordinates, time, unique scanner ID) to the server 430. As previously mentioned, the bar code for employees may have a prefix that defines the function (e.g., assignment) so that the server 430 knows that when that bar code is received that it is assigning that employee to the scanner. After the scan is processed by the server 430 the scanner is then associated with the employee.

For any tasks performed using that scanner, the associated employee will also be linked to the activity. That is, there may be no need to identify the employee for each event they perform as the server 430 will make that association based on the assignment of the employee to the scanner. If the scanner is transferred from one employee to another, the new employee may scan their ID and the scanner may become associated with the new employee. The scanner may stay associated with the employee until another employee scans their bar code at which point the scanner is associated with the new employee.

FIG. 8C illustrates the process of using the scanner to track the automobile. When an employee is going to perform a function on the automobile they scan the automobile bar code 850 and the scanner transmits the scanned data (e.g., bar code, GPS coordinates, time, unique scanner ID) to the server 430. The employee then scans a bar code associated with the function 860 and the scanner transmits the scanned data (e.g., bar code, GPS coordinates, time, unique scanner ID) to the server 430. As previously mentioned, the bar code for functions may have a prefix that defines the function so that the server 430 knows that when that bar code is received it is opening/closing the function for that vehicle. The first time the function code is scanned in relation to an automobile the function may be opened for the automobile and the next time the function code is scanned the function may be closed for the automobile. The process repeats for the various functions performed on the automobile.

As previously mentioned, the function bar codes may be associated with shop/staging area operations or specific tasks. For example, if the automobile enters the auto body shop an employee may scan the automobile bar code and then scan the auto body shop bar code to open the body shop work order for that automobile. As employees within the body shop start to work on tasks defined on the work order they can select a function bar code associated with the task and scan the bar code for the automobile and the function bar code for the task to initiate/open the task for the automobile in the auction system. When they complete the task they can again scan automobile bar code and the task bar code to close out the task for the automobile. Once the work order is complete and the automobile is ready to exit the body shop an employee may scan the automobile bar code and the body shop badge code to close out the body shop work order for the automobile.

It should be noted that it is possible that there are not function cards associated with all tasks that may need to be performed on an automobile, as not all of the tasks may be standard tasks that a bar code was created for. For these tasks the work performed may have to be entered in the computer as is currently done.

According to one embodiment, when a work order is generated for a vehicle the auction system may assign bar codes to the tasks. The bar codes assigned may be the standard bar codes that are utilized to scan tasks on a shop floor discussed above. For unique tasks unique bar codes may be assigned. Once the automobile is checked into the shop, a user may scan the automobile bar code and then scan a function bar code associated with printing the work order for the associated automobile. The auction system may generate the bar codes associated with each of the tasks and print these bar codes to a printer. The printer where the bar codes are sent may be a defined printer or may be a printer closest to the GPS coordinates associated with the scan. Alternatively, the user may also scan a bar code of a printer to have the bar coded tasks printed to. The employees in the shop can use the printed bar coded tasks rather than standard task cards to initiate/close tasks.

According to one embodiment, the work order printed when the automobile first enters the automobile auction facility may include bar codes for each of the tasks assigned to the automobile. An employee may scan the automobile bar code and the associated bar code from the work order when work on a task is initiated and completed.

It should be noted that the function scan 860 is illustrated as a dotted box because it may not be required. For example, if the automobile is simply being moved from one location to another there may be no need to track the event, rather the recording of the GPS coordinates associated with the starting and ending locations may be sufficient. Likewise if the automobile is simply being scanned to record its location for tracking purposes there is really no need for a task to be assigned thereto. Alternatively, the server 430 may associate the fact that a parking attendant employee scanned the automobile bar code as an indication that the function being performed is the movement of the automobile. The first time the automobile bar code is scanned it may be associated with the opening of a move automobile task and the second time the automobile bar code is scanned it may be associated with the closing of the move automobile task. According to one embodiment, to have the auction system operate in the same fashion and have a function code scanned each time the automobile code is scanned, there may be a function bar code associated with moving an automobile that the employee scans each time he scans an automobile.

Figure 9:
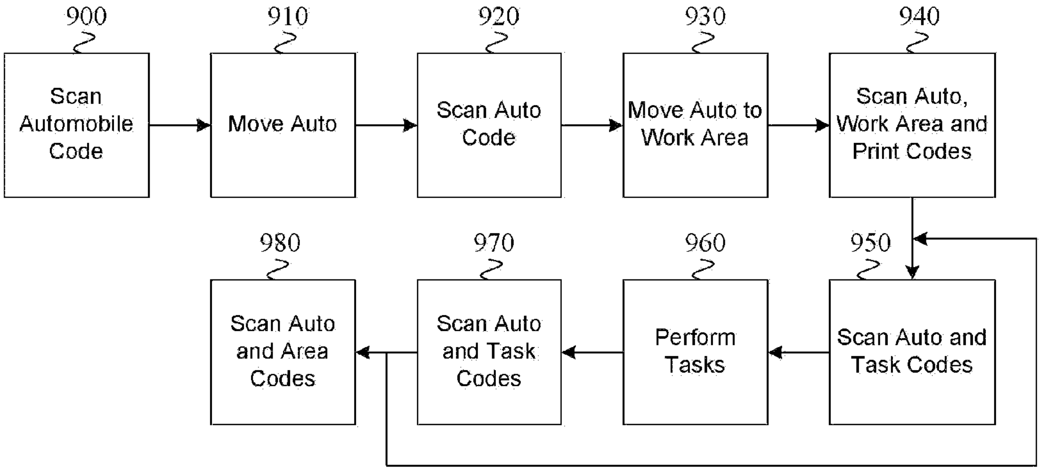
FIG. 9 illustrates an example flow chart of operations performed on an automobile as it traverses the auction facility, according to one embodiment.

FIG. 9 illustrates an example flow chart of operations performed on an automobile as it traverses the automobile auction facility. After the automobile is received at the automobile auction facility and assigned a bar code, it is assigned a lot to be parked in while it waits for service to be performed. An employee may use their scanner and scan the automobile bar code 900, then move the automobile to the assigned lot 910, and then scan the automobile bar code again 920. The steps 900-920 will record the current location and the new location for the automobile, and the change in location will be associated with the employee associated with the scanner used to scan the automobile codes. The automobile may then be moved into a work area 930, such as a mechanic shop. The auto code, the work area code and the print work order code may be scanned 940. This may open the work order associated with the automobile for that shop and print out bar codes for the tasks associated with the work order. For example, the task codes may be rotating the tires, changing the oil and replacing the spark plugs and wires.

The task codes may be placed on the automobile. When an employee begins a task on the automobile they may scan the auto code and the task code to initiate the task 950. The task may be associated with the employee who is assigned the scanner used to scan the codes. The employee may then perform the task 960 and upon completion of the task they may scan the auto code and the task code to close out the task 970. If additional tasks are still associated with the work order, the steps 950-970 may be repeated and the tasks may be associated with the employee who is assigned the scanner used to scan the codes. Upon completion of all the tasks on the work order the auto code and area code may be scanned 980 to close out the work order for that shop. If the automobile is moved to another shop for processing the process may repeat steps 930-980 for the next shop. If the automobile is to be moved to a lot the process may repeat steps 910-930.

Using the scanner to record various tasks performed, who performed the tasks, the location where the task occurred and the time of each scan associated with a task provides an abundant amount of information to the auction system 320 (server 430). The auction system 320 can utilize this information to assist in tracking inventory and the management of the operations of the automobile auction facility. For example, this data may be processed so that the auction system 320 can define the work done by each shop and/or each employee. The auction system 320 may be able determine potential bottlenecks or efficiencies in the operations. The various data analysis and reporting that can be performed by the auction system 320 based on the data received using the device 100, and the function codes for employees, work orders, tasks, shops, and the like are within the scope of the current invention.

Figure 10:
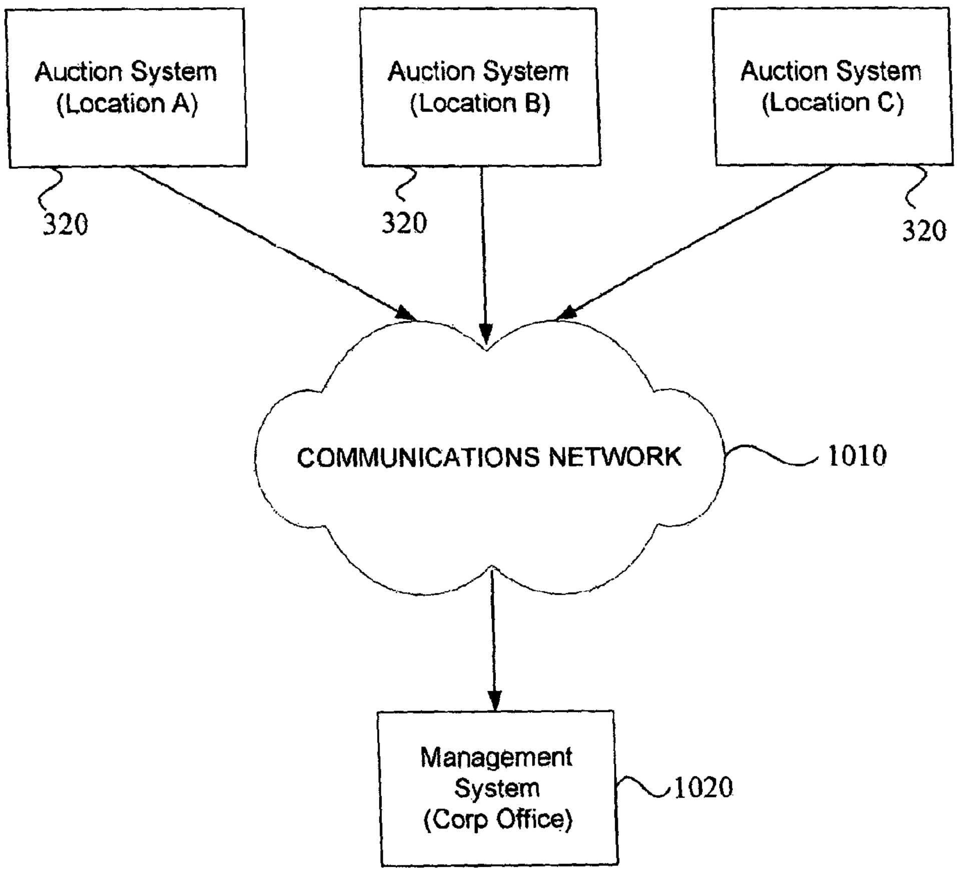
FIG. 10 illustrates auctions systems for various locations communicating with a management server via a communications network, according to one embodiment.

FIG. 10 illustrates the auction systems 320 for various locations communicating with a management system 1020 via a communications network 1010 (e.g., Internet). The communications between the auction systems 320 and the management system 1020 may not include specific location data for individual automobiles but may include data related to inventory, automobiles processed and the like.

It should be noted that while the disclosure focused on using the invention in the context of an automobile auction lot it is not limited thereto. For example, the invention may be utilized at other venues (e.g., car dealerships, car rental facilities, large automotive shops) where tracking the location of automobile and/or the work performed on the automobiles is important for effective inventory control and operations management. Furthermore, the invention is not limited to use on automobiles. Rather the invention may be implemented to track inventory and operations on larger items that are located at various processing facilities. For example, the auction system may be implemented to track the inventory, location and processing of computers or other electronic devices at a large distribution/repair facility.

Although the disclosure has been illustrated by reference to specific embodiments, it will be apparent that the disclosure is not limited thereto as various changes and modifications may be made thereto without departing from the scope. Reference to "one embodiment" or "an embodiment" means that a particular feature, structure or characteristic described therein is included in at least one embodiment. Thus, the appearances of the phrase "in one embodiment" or "in an embodiment" appearing in various places throughout the specification are not necessarily all referring to the same embodiment.

The various embodiments are intended to be protected broadly within the spirit and scope of the appended claims.

What is claimed is:

1. An automobile auction system for determining locations of automobiles at an automobile auction facility comprising a plurality of vehicles, the automobile auction system comprising:

one or more custom scanning devices, wherein each custom scanning device comprises a bar code scanner configured to scan bar codes on the automobiles and a GPS sensor configured to record corresponding GPS coordinates associated with locations of the automobiles obtained at the time of the scanning, and wherein each custom scanning device does not have a user interface that enables users to enter data therein;

a captured data interface configured to receive captured data from the one or more custom scanning devices, wherein the captured data comprises the scanned bar codes, the corresponding GPS coordinates associated with the locations of the automobiles, scanner ID, and times of scans;

a map interface configured to receive mapping data from a map source, wherein the mapping data comprises a map of the automobile auction facility; and a server configured to process the scanned bar codes and the corresponding GPS coordinates associated with the locations of the automobiles, wherein the server associates the scanned bar codes and the corresponding GPS coordinates associated with the locations of the automobiles to the map and displays the location of the GPS coordinates on the map wherein the location of the GPS coordinates on the map comprise specific physical locations at the automobile auction facility where the barcodes on the automobiles were scanned and where the corresponding GPS coordinates associated with the automobiles were recorded at the time of the scanning, said system operable to determine the location of a plurality of automobiles at the facility.

2. The automobile auction system of claim 1, wherein each custom scanning device comprises a scan button to initiate scanning and a bar code scanning engine for reading the scanned bar codes.

3. The automobile auction system of claim 1, further comprising one or more WiFi access points located throughout the automobile auction facility that provide the captured data to the server, wherein each custom scanning device further comprises a WiFi module for, transmitting the captured data to the one or more WiFi access points.

4. The automobile auction system of claim 3, wherein each custom scanning device further comprises a processor and memory;

wherein the processor controls operations of the custom scanning device; and wherein the captured data is stored in the memory if the captured data cannot be transmitted to the server via the WiFi module or if transfer of the captured data is not successful.

5. The automobile auction system of claim 1, further comprising a database, wherein the server writes the captured data and the mapping data onto the database.

6. The automobile auction system of claim 1, further comprising a management server that interacts with the server, wherein the management server controls operations of the automobile auction facility.

7. The automobile auction system of claim 1, wherein the server is able to plot areas on the map and define the GPS coordinates associated with the areas;

wherein the server utilizes the GPS coordinates for each of the areas to determine which areas the automobiles are located in; and wherein if a particular automobile needs to be found the server highlights a location of the particular automobile on the map, identifies the GPS coordinates and an approximate location of the particular automobile on the map, or combinations thereof.

8. The automobile auction system of claim 7, wherein a grid is overlaid on the map and used to draw locations of the areas on the map;

wherein GPS markers for the GPS coordinates of the automobiles are illustrated on the map when the bar codes are scanned and the GPS coordinates are received; and wherein the GPS coordinates of the automobiles are compared to the GPS coordinates associated with the areas to determine the location of the automobiles.

9. The automobile auction system of claim 8, wherein the automobile auction system is able to identify a capacity of each of the areas based on the location of each of the automobiles in the automobile auction facility.

10. The automobile auction system of claim 1, wherein the bar codes are associated with functions, specific tasks, and work orders; and wherein the bar codes associated with functions have a prefix that the server recognizes.

11. The automobile auction system of claim 10, wherein the bar codes associated with functions assign the custom scanning devices to employees, record tasks being performed, record employees performing the tasks, and record shop or staging operations that are opened or completed.

12. The automobile auction system of claim 10, wherein the work orders are opened the first time the associated bar code is scanned and are closed the second time the associated bar code is scanned.

13. The automobile auction system of claim 1, wherein bar code stickers identifying the automobile are on each automobile; and wherein work orders defining tasks to be performed on the automobiles are secured to the automobiles or placed within the automobiles.

14. The automobile auction system of claim 1, wherein the automobile auction system utilizes the captured data to track inventory and management of operations of the automobile auction facility.

15. The automobile auction system of claim 1, wherein the automobile auction system communicates data related to inventory and automobiles processed to a management system via a communications network.

16. A method for tracking an automobile at an automobile auction facility comprising a plurality of vehicles using an automobile auction system, the method comprising:

scanning bar codes on the automobile and recording corresponding GPS coordinates associated with a location of the automobile at the time of the scanning using one or more custom scanning devices, wherein each custom scanning device comprises a bar code scanner and a GPS sensor, and wherein each custom scanning device does not have a user interface that enables users to enter data therein;

receiving captured data from the one or more custom scanning devices, wherein the captured data comprises the scanned bar codes, the corresponding GPS coordinates associated with the location of the automobile, scanner ID, and times of scans;

receiving mapping data from a map source, wherein the mapping data comprises a map of the automobile auction facility; and processing the scanned bar codes from the automobile and the corresponding GPS coordinates associated with the location of the automobile using a server, associating the scanned bar codes and the corresponding GPS coordinates associated with the automobile location to the map, and displaying the location of the GPS coordinates on the map wherein the location of the GPS coordinates on the map comprise specific physical locations at the automobile auction facility where the barcodes on the automobiles were scanned and where the corresponding GPS coordinates associated with the automobile were recorded at the time of the scanning, said facility comprising a plurality of automobiles operable to be tracked by said method.

17. The method of claim 16, further comprising:

providing information to the automobile auction system by using the custom scanning device to record various tasks performed on the automobile, who performed the tasks, the location where the tasks occurred, and the time of each scan associated with the tasks;

wherein the automobile auction system utilizes the information to assist in tracking inventory and management of operations of the automobile auction facility, including determining potential bottlenecks or efficiencies in the operations.

18. The method of claim 16, further comprising:

plotting areas on the map;

defining GPS coordinates associated with the areas;

determining which areas the automobile is located in; and highlighting a location of the automobile on the map, identifying the GPS coordinates and an approximate location of the automobile on the map, or combinations thereof.

19. The method of claim 18, further comprising:

overlaying a grid on the map used to draw locations of the areas on the map;

illustrating the GPS marker on the map when the bar codes are scanned and the GPS coordinates are received; and comparing the GPS coordinates the GPS coordinate associated with the areas to determine the location of the automobile.

20. The method of claim 18, further comprising identifying a capacity of each of the areas based on the location of automobiles in the automobile auction facility.

* * * * *